United States Patent
Hiraiwa et al.

(10) Patent No.: US 12,074,349 B2
(45) Date of Patent: Aug. 27, 2024

(54) METAL POROUS BODY, METHOD OF PRODUCING THE SAME, AND FUEL CELL

(71) Applicant: Sumitomo Electric Industries, Ltd., Osaka (JP)

(72) Inventors: Chihiro Hiraiwa, Osaka (JP); Masatoshi Majima, Osaka (JP); Takahiro Higashino, Osaka (JP); Naho Mizuhara, Osaka (JP); Hiromasa Tawarayama, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 139 days.

(21) Appl. No.: 16/971,786

(22) PCT Filed: Jan. 9, 2019

(86) PCT No.: PCT/JP2019/000361
§ 371 (c)(1),
(2) Date: Aug. 21, 2020

(87) PCT Pub. No.: WO2019/167433
PCT Pub. Date: Sep. 6, 2019

(65) Prior Publication Data
US 2021/0083301 A1    Mar. 18, 2021

(30) Foreign Application Priority Data
Feb. 27, 2018   (JP) ................. 2018-032912

(51) Int. Cl.
*H01M 8/0232* (2016.01)
*H01M 8/0247* (2016.01)
(Continued)

(52) U.S. Cl.
CPC ....... *H01M 8/0232* (2013.01); *H01M 8/0247* (2013.01); *H01M 8/12* (2013.01);
(Continued)

(58) Field of Classification Search
CPC .. H01M 8/0202; H01M 8/023; H01M 8/0232; H01M 8/12; H01M 8/1226;
(Continued)

(56) References Cited

U.S. PATENT DOCUMENTS 6,410,160 B1 * 6/2002 Landin .................. B22F 3/1007
264/662
2007/0072070 A1 * 3/2007 Quek .................. H01M 8/1246
429/534
(Continued)

FOREIGN PATENT DOCUMENTS

JP    2006-207783 A    8/2006
JP    2013-082965 A    5/2013
(Continued)

*Primary Examiner* — Jeremiah R Smith
(74) *Attorney, Agent, or Firm* — Faegre Drinker Biddle & Reath LLP

(57) ABSTRACT

A metal porous body having a frame of a three-dimensional network structure, the frame being formed of a plurality of bone members connected to each other, the plurality of bone members defining openings in a surface of the metal porous body, the plurality of bone members defining voids inside the metal porous body, the openings and the voids communicating with each other, a porosity being from 1 volume % to 55 volume %, a density being from 3 g/cm$^3$ to 10 g/cm$^3$.

2 Claims, 4 Drawing Sheets

(51) Int. Cl.
*H01M 8/12* (2016.01)
*B22F 3/11* (2006.01)

(52) U.S. Cl.
CPC ............... *B22F 3/11* (2013.01); *B22F 3/1103* (2013.01); *H01M 2008/1293* (2013.01)

(58) Field of Classification Search
CPC ....... H01M 2008/1293; H01M 8/0247; H01M 4/8807; B22F 3/11; B22F 3/1103
See application file for complete search history.

(56) References Cited

U.S. PATENT DOCUMENTS

| | | | |
|---|---|---|---|
| 2017/0077526 A1* | 3/2017 | Hiraiwa | ............... H01M 8/0232 |
| 2018/0093318 A1* | 4/2018 | Hiraiwa | ................. H01M 4/80 |
| 2018/0205095 A1 | 7/2018 | Hiraiwa et al. | |
| 2018/0219232 A1* | 8/2018 | Okuno | .................... C22C 19/05 |
| 2018/0261853 A1 | 9/2018 | Okuno et al. | |
| 2019/0044159 A1 | 2/2019 | Miyamoto et al. | |
| 2020/0099063 A1 | 3/2020 | Okuno et al. | |

FOREIGN PATENT DOCUMENTS

| | | | | |
|---|---|---|---|---|
| JP | 2014-89893 A | | 5/2014 | |
| JP | 2016-64552 A | | 4/2016 | |
| WO | WO-2015182404 A1 | * | 12/2015 | ........... B01D 53/326 |
| WO | WO-2016/170805 A1 | | 10/2016 | |
| WO | WO-2017/010436 A1 | | 1/2017 | |
| WO | WO 2017/022542 A1 | | 2/2017 | |
| WO | WO-2017/026291 A1 | | 2/2017 | |
| WO | WO-2017/043365 A1 | | 3/2017 | |
| WO | WO-2017/130880 A1 | | 8/2017 | |

* cited by examiner

METAL POROUS BODY, METHOD OF PRODUCING THE SAME, AND FUEL CELL

TECHNICAL FIELD

The present disclosure relates to a metal porous body, and a method of producing the same, and a fuel cell. The present application claims the benefit of priority to Japanese Patent Application No. 2018-032912 filed on Feb. 27, 2018, the entire contents of which are incorporated herein by reference.

BACKGROUND ART

Weight reduction for electronic devices, automobiles, and the like is a recent trend, and along with that trend, attention has been directed to metal porous bodies. Metal porous bodies have a large specific surface area, an excellent breathability, and an excellent electrical conductivity. Therefore, metal porous bodies are expected to be usable as heat exchanging material, heat insulating material, sound absorbing material, impact absorbing material, carriers for various chemical substances (such as catalysts), filter material, gas channels of fuel cells, electrodes or current collectors of various batteries, adsorbing material, electromagnetic-wave-shielding material, and the like.

As such metal porous bodies, metal meshes of a two-dimensional porous structure and sponge-shaped metals of a three-dimensional porous structure are known. The metal mesh is obtained by weaving metal fibers, for example. The sponge-shaped metal is obtained by such methods as a method involving adding a blowing agent to a molten metal, stirring, and then cooling (a precursor method), a method involving sintering metal powder, and a method involving mixing metal powder and spacer powder, sintering, and then removing the spacer (a spacer method, found in, for example, Japanese Patent Laying-Open No. 2013-082965 (PTL 1)).

CITATION LIST

Patent Literature

PTL 1: Japanese Patent Laying-Open No. 2013-082965

SUMMARY OF INVENTION

An aspect of the present disclosure relates to a metal porous body having a frame of a three-dimensional network structure, the frame being formed of a plurality of bone members connected to each other, the plurality of bone members defining openings in a surface of the metal porous body, the plurality of bone members defining voids inside the metal porous body, the openings and the voids communicating with each other, a porosity being from 1 volume % to 55 volume %, a density being from 3 g/cm$^3$ to 10 g/cm$^3$.

Another aspect of the present disclosure relates to a method of producing a metal porous body, comprising: a first step involving preparing a metal material having a frame of a three-dimensional network structure; and a second step involving pressing the metal material.

A further aspect of the present disclosure relates to a fuel cell comprising: a cathode; an anode; an electrolyte layer interposed between the cathode and the anode; and the above-described metal porous body disposed to face at least one of the cathode and the anode.

DETAILED DESCRIPTION

Figure 1:
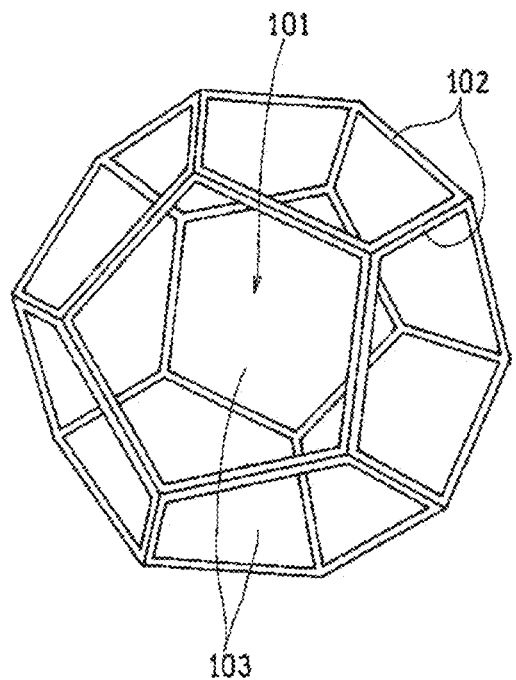
FIG. 1 is a schematic view of an example structure of a part of the frame of the metal material.

Problem to be Solved by the Present Disclosure

Among such metal porous bodies, a sponge-shaped metal has many electron pathways and has a low resistance itself. However, when used as a current collector of a battery, a sponge-shaped metal comes into point-contact with an electrode and therefore tends to increase resistance. Particularly in a solid oxide fuel cell (hereinafter called SOFC), resistance markedly increases. This is due to a ceramic body (sintered body) contained in an SOFC as an electrode.

The present disclosure has been devised in light of the above-described circumstances, and has an object to provide a metal porous body with a low resistance and an excellent fluid permeability, a method of producing the same, and a fuel cell.

Advantageous Effect of the Present Disclosure

The present disclosure can provide a metal porous body with a low resistance and an excellent fluid permeability. It can also provide a method of obtaining the metal porous body in a very easy and simple manner. It can further provide a fuel cell with an excellent power-generating performance.

DESCRIPTION OF EMBODIMENTS

In the following, the contents of embodiments of the present disclosure are listed and described.

(1) A metal porous body according to the present disclosure is a metal porous body having a frame of a three-dimensional network structure, the frame being formed of a plurality of bone members connected to each other, the plurality of bone members defining openings in a surface of the metal porous body, the plurality of bone members defining voids inside the metal porous body, the openings and the voids communicating with each other, a porosity being from 1 volume % to 55 volume %, a density being from 3 g/cm$^3$ to 10 g/cm$^3$. This metal porous body has a low resistance and an excellent fluid permeability.

(2) Preferably, the diameter of the openings is from 3 μm to 55 μm. With this configuration, resistance is maintained low and fluid permeability is further improved.

(3) Preferably, the metal porous body has a sheet-like outer shape and the thickness is from 0.05 mm to 0.2 mm. With this configuration, the size of an electronic device in which the metal porous body is to be included is easily reduced while a required level of strength is maintained.

(4) A method of producing a metal porous body according to the present disclosure comprises: a first step involving preparing a metal material having a frame of a three-dimensional network structure; and a second step pressing the metal material. By such an easy and simple method, a metal porous body with a low resistance and an excellent fluid permeability is obtainable.

(5) In the second step, a plurality of the metal materials may be stacked so that the metal materials overlap at least partially, and parts thus overlapping may be pressed. With this configuration, the density and the porosity of the resulting metal porous body may be controlled and thereby a desired metal porous body may be easily obtained.

(6) A fuel cell according to the present disclosure comprises: a cathode: an anode; an electrolyte layer interposed between the cathode and the anode; and the above-described metal porous body disposed to face at least one of the cathode and the anode. This fuel cell has an excellent power-generating performance.

DETAILED DESCRIPTION OF EMBODIMENTS

In the following, a specific description will be given of embodiments of the present disclosure. It is intended that the scope of the present invention is defined by claims, not by the contents given below, and encompasses all modifications and variations equivalent in meaning and scope to the claims.

Metal Porous Body

A metal porous body according to the present embodiment comprises a first surface and a second surface opposite to the first surface, and is formed of fiber-shaped metal (hereinafter called metal fibers). The first surface and the second surface have openings defined by entangled metal fibers. An internal region between the first surface and the second surface has voids that are formed by three-dimensional entanglement of the fiber-shaped metal. In these terms, the metal porous body according to the present embodiment is different from either of a metal mesh and a sponge-shaped metal such as a sintered body. The "fiber-shaped" refers to a shape extending in one direction, and it may be linear (rod-shaped) or curved. The length of the fiber-shaped metal has no limit to it.

In one aspect of the present embodiment, the metal porous body is a metal porous body having a frame of a three-dimensional network structure, the frame being formed of a plurality of bone members connected to each other, the plurality of bone members defining openings in a surface of the metal porous body, the plurality of bone members defining voids inside the metal porous body. The "three-dimensional network structure" and the "bone members" will be described below. The metal porous body may comprise a first surface and a second surface opposite to the first surface. When the metal porous body has a sheet-like outer shape, the first surface may be regarded as one main face of the sheet-like outer shape and the second surface may be regarded as the other main face of the sheet-like outer shape.

The openings and the voids communicate with each other, with a porosity of the entire metal porous body being from 1 volume % to 55 volume %. In other words, the porosity of the metal porous body compares favorably with that of a metal mesh or a sponge-shaped metal. Therefore, the metal porous body has an excellent fluid permeability.

The density of the metal porous body is from 3 g/cm$^3$ to 10 g/cm$^3$, which is dense. Therefore, the metal porous body has a low resistance while having a high fluid permeability. Further, in an aspect of the present embodiment, an internal region of the metal porous body has a structure in which the metal fibers are entangled in three dimensions, and thereby the metal porous body tends to be deformed plastically. As a result, contact between the metal porous body and other components (such as electrodes) may be enhanced without damaging these other components. In other words, the metal porous body tends to come into line-contact, or even plane-contact, with other components. For these reasons, the metal porous body according to the present embodiment is particularly suitable as a current collector of a fuel cell that is designed to come into contact with a ceramic electrode.

The porosity (void rate) of the entire metal porous body is preferably from 5 volume % to 50 volume %, more preferably from 5 volume % to 40 volume %, further preferably from 5 volume % to 10 volume %. The porosity (volume %) is calculated by $\{1-(\text{apparent mass of metal porous body per unit volume})/(\text{true specific gravity of metal porous body})\} \times 100$. The "true specific gravity of metal porous body" means the specific gravity of the metal constituting the metal porous body.

The density of the metal porous body is preferably from 4 g/cm$^3$ to 9 g/cm$^3$, more preferably from 5 g/cm$^3$ to 8.5 g/cm$^3$, further preferably from 6 g/cm$^3$ to 8.5 g/cm$^3$. The density (g/cm$^3$) is calculated by dividing the mass (g) of the metal porous body by the apparent volume (cm$^3$). The "apparent volume" may be regarded as the volume of the metal porous body estimated from the outer shape thereof.

The diameter of the openings formed in each surface of the metal porous body (opening diameter $D_S$) is not particularly limited and may be selected as appropriate in accordance with the applications. Specifically, the opening diameter $D_S$ is preferably from 3 μm to 55 μm, more preferably from 5 μm to 20 μm, further preferably from 5 μm to 15 μm, particularly preferably from 5 to 12 μm. With this configuration, resistance is maintained low while fluid permeability is further improved. The opening diameters $D_S$ of the openings in the first surface and that of the openings in the second surface (which may be called first openings and second openings, respectively, hereinafter) may be the same as or different from each other.

The opening diameter $D_S$ is determined in the below-described manner, for example. In an SEM photograph of the first surface taken in a direction of a normal, a region Rs is determined so that it includes five or more entire first openings. Among all the first openings in region Rs, five are randomly selected, for example. For each first opening, the diameter of the largest precise circle that can be accommodated within that particular first opening is measured, and the diameter of the smallest precise circle that can accommodate the particular first opening is measured, and then the average of these is calculated. The resultant is regarded as the diameter of the particular first opening. The diameters of the five selected first openings are averaged and used as the opening diameter $D_S$. In the same manner, the opening diameter $D_S$ of the second opening is determined.

Diameter Ws of the metal fibers in each surface of the metal porous body is not particularly limited. Specifically, from the viewpoints of fluid permeability and strength, diameter Ws is preferably from 20 μm to 200 μm, more preferably from 50 μm to 100 μm, further preferably from 65 μm to 100 μm, particularly preferably from 65 μm to 90 μm. Diameter Ws is the length of a cross section of a metal fiber vertical to the longitudinal direction of the metal fiber. For example, diameter Ws is the average of the diameters of any five locations of metal fibers within region Rs.

Diameter Ws of the metal fibers in the first surface may be the same as or different from diameter Ws of the metal fibers in the second surface. Preferably, the diameter of the bone members described below is equivalent to the diameter of the metal fibers. When the metal porous body has a sheet-like outer shape (as in FIG. 3, for example), the thickness of the metal porous body (the distance between the first surface and the second surface) is not particularly limited and may be selected as appropriate in accordance with the applications. Specifically, from the viewpoints of size reduction and strength, the thickness of the metal porous body is preferably from 0.05 mm to 0.2 mm, more preferably from 0.1 mm to 0.19 mm, further preferably from 0.1 mm to 0.18 mm. The thickness may be measured with a commercially available digital thickness gauge, for example.

The specific surface area (BET specific surface area) of the metal porous body is not particularly limited and may be selected as appropriate in accordance with the applications. For example, the specific surface area of the metal porous body may be from 100 $m^2/m^3$ to 9000 $m^2/m^3$, and may be from 200 $m^2/m^3$ to 6000 $m^2/m^3$. The specific surface area may be measured by a BET measurement method, for example.

The metal constituting the metal porous body may be selected as appropriate in accordance with the applications or the environment of use, and the type of the metal is not particularly limited. Examples of the metal include copper, copper alloys (alloys of copper with Fe, Ni, Si, Mn, and/or the like), nickel or nickel alloys (alloys of nickel with tin, chromium, tungsten, and/or the like), aluminum or aluminum alloys (alloys of aluminum with Fe, Ni, Si, Mn, and/or the like), and stainless steel.

In the voids of the metal porous body, substances such as various catalysts, adsorbing materials, electrode active materials, and electrolytes may be held. With this configuration, the metal porous body is capable of exhibiting various functions.

Method of Producing Metal Porous Body

The metal porous body may be obtained by a very easy and simple method, namely, pressing a metal material having a frame of a three-dimensional network structure. More specifically, the metal porous body is produced by a method comprising a first step involving preparing a metal material and a second step involving pressing the metal material. In the second step, a plurality of the metal materials may be stacked so that the metal materials overlap at least partially, and parts thus overlapping may be pressed.

Next, the metal material will be described referring to drawings. FIG. 1 is a schematic view of an example structure of a part of the frame of the metal material, and FIG. 2 is a sectional schematic view of a cross section of the part of the frame.

The metal material has pores and a metal frame. In this case, the metal material is composed of a plurality of cells each having a pore (void) and a metal frame. Each cell may be illustrated as a regular dodecahedron, as in FIG. 1, for example. A pore 101 is defined by fiber- or rod-shaped metal members (fiber members 102 or bone members 102), and a plurality of pores are connected three-dimensionally. In an aspect of the present embodiment, fiber members 102 correspond to the metal fibers of the metal porous body.

The frame of a cell is formed of fiber members 102 that are connected to each other. The cell has substantially-pentagonal windows 103 each defined by fiber members 102. Windows 103 correspond to the first opening and the second opening of the metal porous body. Adjacent cells share one window 103 through which they communicate with each other. In other words, the frame of the metal material is formed of fiber members 102 that define the plurality of connected pores 101 and form a network structure. The frame of this structure is called a frame of a three-dimensional network structure. The three-dimensional network structure according to the present embodiment includes a structure composed of cells that are deformed in shape due to pressing and/or the like (for example, cells having a shape of collapsed regular dodecahedron). In other words, the metal material pressed in the second step described below (metal porous body) is regarded as having a three-dimensional network structure.

Figure 2:
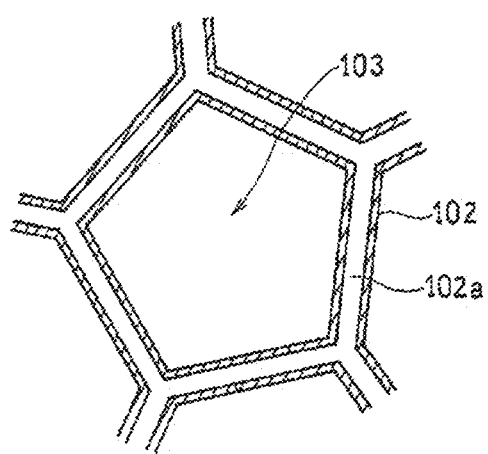
FIG. 2 is a sectional schematic view of a cross section of the part of the frame shown in FIG. 1.

As shown in FIG. 2, fiber members 102 may have cavities 102a inside thereof; in other words, fiber members 102 may be hollow. The metal material having a hollow frame has a bulky three-dimensional structure but it is very light.

For example, the metal material may be formed by coating a resin porous body with the above-mentioned metal. The metal coating may be performed by plating treatment, vapor phase processes (such as evaporation, plasma chemical vapor deposition, sputtering), and/or metal paste application, for example. By the metal coating treatment, the frame of a three-dimensional network structure is formed. Among these coating methods, plating treatment is preferable.

The plating treatment may be any plating treatment capable of forming a metal layer on the surface of the resin porous body (including the surfaces of the voids inside), and a known plating treatment method such as electrolytic plating and/or molten salt plating may be employed. By the plating treatment, a metal material comprising a three-dimensional network structure that reflects the shape of the resin porous body is formed. With the configuration in which the plating treatment is performed by electrolytic plating, it is desirable that an electrically conductive layer be formed prior to the electrolytic plating. The electrically conductive layer may be formed on a surface of the resin porous body by electroless plating, evaporation, sputtering, applying an electrically conductive agent, immersing the resin porous body in a dispersion containing an electrically conductive agent, and/or the like.

The resin porous body is not particularly limited as long as it has voids, and it may be, for example, a resin foam and/or a resin nonwoven fabric. Among these, a resin foam is preferable because communicating pores are easily formed in it. The resin constituting the porous body is preferably a resin that allows, after metal coating treatment, hollowing fiber members 102 by degradation, dissolution, or the like while maintaining the shape of the metal frame of a three-dimensional network structure. Examples may include thermosetting resins such as thermosetting polyurethane and melamine resin, and thermoplastic resins such as olefin resins (such as polyethylene and polypropylene) and thermoplastic polyurethane. Among these, thermosetting polyurethane and the like are preferable because pores with uniform size and shape tend to be formed.

Desirably, resin that is present inside the frame is removed via degradation or dissolution by means of heat treatment and/or the like. After the heat treatment, residual components remaining inside the frame (resin, degradation products, unreacted monomers, additives contained in the resin, and/or the like) may be removed by washing and/or the like. If required, the resin may be removed by heat treatment while voltage being applied thereto as appropriate. This heat treatment may be carried out while the plated porous body is immersed in a molten salt plating bath under voltage application. By thus removing the resin inside after metal coating treatment, a cavity is formed inside the frame of the metal porous body and the frame becomes hollow inside. The metal material thus obtained has a frame of a three-dimensional network structure that reflects the shape of the resin foam. As a commercially available metal material, "Aluminum-Celmet" (registered trademark) or "Celmet" (registered trademark) made of copper or nickel, both products manufactured by Sumitomo Electric Industries, Ltd., may be used.

(First Step)

In a first step, the above-described metal material having a frame of a three-dimensional network structure is prepared.

As described below, when a plurality of metal materials are used, the configurations of the metal materials (metal type, thickness, porosity, and the like) may be the same as or different from each other. The number of the metal materials may be any number equal to or greater than 1, and may be selected as appropriate in consideration of the density and the porosity of a desired metal porous body. Specifically, from the viewpoint of size reduction and fluid permeability, the number of the metal materials is preferably 6 or less.

Second Step

In a second step, the metal material is pressed. By this, the metal frame (fiber members 102) of the metal material is deformed plastically so that the metal fibers become entangled with each other. Alternatively, the metal frame (bone members 102) of the metal material is deformed plastically so that the plurality of bone members come into contact with each other. Thus, the resulting metal porous body has a relatively high porosity and a high density. In addition, the resulting metal porous body may be thin. The porosity of the metal porous body is from 1 volume % to 55 volume %, for example. The density is from 3 g/cm$^3$ to 10 g/cm$^3$, for example.

Typically, a fuel cell is made by disposing a pair of current collectors to sandwich a pair of electrodes as well as an electrolyte layer interposed therebetween to form a cell, and stacking a plurality of such cells (50 or more of them, for example). A conventional sponge-shaped metal is difficult to make thin due to its manufacturing process, and therefore the thickness of each cell tends to be great. When a metal mesh is used, each fiber metal needs to be thick for maintaining sufficient electron pathways, and therefore the thickness of each cell tends to be great. In contrast, the metal porous body obtained according to the present embodiment is thin, and therefore it can reduce the size of the resulting fuel cell while maintaining a high power-generating performance.

Further, by pressing, the part of the metal fibers exposed to the surface of the metal material and in contact with a press machine (corresponding to the first surface and the second surface of the metal porous body) tends to be flat. As a result, the area of the first surface and the second surface in contact with other components such as an electrode may be larger. It should be noted that the metal material comprises a frame of a three-dimensional network structure and thereby it is deformed plastically and has a moderate level of elasticity. Therefore, the metal material tends not to be damaged by pressing.

The method of pressing is not particularly limited, and examples thereof include roll pressing and flat pressing. The pressing may be carried out while heating. Particularly preferably, from the viewpoint of cost and production efficiency, the bonding is achieved by roll pressing at normal temperature. The pressing conditions are not particularly limited, and may be set as appropriate in consideration of a desired porosity, density, and the like. For instance, the pressing is carried out so that the thickness of the resulting metal material is from 1% to 10%, from 2% to 7%, or from 2.5% to 5.5%. The pressing pressure during this may be 10 kPa or higher, or 100 kPa or higher, for example. The pressing pressure may be 4000 kPa or lower, or 5000 kPa or lower.

With the configuration in which the metal porous body is made of a sintered body of metal powder, pressing is difficult to carry out. This is because a sintered body tends not to deform plastically and may be damaged by pressing.

In the second step, a plurality of metal materials may be stacked so that they overlap at least partially, and the parts thus overlapping may be pressed. With this configuration, the density and the porosity of the resulting metal porous body tend to be easily controlled and thereby a desired metal porous body may be easily obtained. In this configuration, the metal frame (fiber members 102 or bone members 102) of at least one metal material present in the overlapping parts is deformed plastically and entangled with the metal frame of the other metal material, and thereby these metal materials are strongly bonded to each other. Also with this configuration, the resulting metal porous body has a high porosity as well as a high density. It is not necessary for the frames of both metal materials to be deformed plastically; the plastic deformation may occur in such a way that the frame of one metal material is partially inserted into window 103 of the other metal material. Alternatively, the frames of both metal materials may be partially deformed plastically in such a way that they become entangled and engaged with each other.

In these manners, the plurality of metal materials are strongly bonded to each other without adhesive present therebetween. As a result, the resulting metal porous body has communicating pores and has an excellent fluid permeability.

Fuel Cell

A fuel cell according to the present embodiment comprises a cathode, an anode, an electrolyte layer interposed between the cathode and the anode, and the above-described metal porous body disposed to face at least one of the cathode and the anode.

The metal porous body functions as a current collector. The metal porous body has a high density as well as a high porosity, and therefore it is particularly suitable as a current collector. When a plurality of current collectors are disposed to face both the cathode and the anode, at least one of the current collectors may be the above-described metal porous body. Particularly preferably, all the current collectors are the above-described metal porous bodies.

Figure 3:
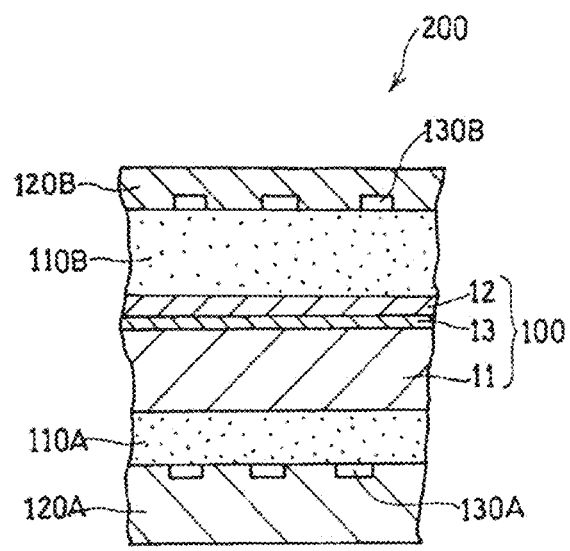
FIG. 3 is a sectional schematic view of a fuel cell according to an embodiment of the present disclosure.

FIG. 3 is a schematic view of a cross section of the structure of a fuel cell 200.

Fuel cell 200 comprises a cathode 12, an anode 11, an electrolyte layer 13 interposed between cathode 12 and anode 11, and current collectors 110A, 110B disposed to face cathode 12 and anode 11. At least one of current collectors 110A, 110B is the above-described metal porous body.

For instance, cathode 12, anode 11, and electrolyte layer 13 are sintered into an integral part and constitute a cell 100. The method of producing cell 100 is not particularly limited, and may be a conventionally known method. For instance, cell 100 may be produced by a method comprising press-shaping an anode material to obtain an anode formed body, stacking an electrolyte layer material on one side of the resulting anode formed body and then sintering, and stacking a cathode material on a surface of the sintered electrolyte layer and sintering.

Fuel cell 200 further comprises a fuel channel 130A for supplying fuel to anode 11 and an oxidizer channel 130B for supplying an oxidizer to cathode 12.

Fuel channel 130A has a fuel gas inlet through which fuel gas enters and a fuel gas outlet through which unused fuel and $H_2O$ generated by reaction (or $CO_2$ when the fuel is a hydrocarbon such as $CH_4$) are discharged (neither the fuel gas inlet nor the fuel gas outlet is shown). Oxidizer channel 130B has an oxidizer inlet through which an oxidizer enters and an oxidizer outlet through which water generated by reaction, unused oxidizer, and the like are discharged (neither the oxidizer inlet nor the oxidizer outlet is shown). Examples of the oxidizer include gases containing oxygen.

When the metal oxide contained in electrolyte layer 13 has oxide ion conductivity, fuel cell 200 is operable at a temperature of 800° C. or below; when the metal oxide has proton conductivity, fuel cell 200 is operable at a temperature of 700° C. or below. The lower limit is not particularly limited, and it may be 400° C. or higher, for example. The operation temperature is preferably within a range of moderate temperature of about 400° C. to about 600° C.

Anode

Anode 11 has an ionically-conductive porous structure. For instance, within anode 11 having proton conductivity, a reaction occurs in which fuel such as hydrogen introduced through fuel channel 130A is oxidized to release protons and electrons (oxidation reaction of fuel). The thickness of anode 11 may be from about 10 μm to about 1000 μm, for example.

The material of anode 11 may be, for example, a known material used as a fuel cell anode. Specific examples include compounds containing nickel as a catalyst component (hereinafter called Ni compound), or a composite oxide of a Ni compound and a metal oxide described below. Anode 11 containing the composite oxide may be made by, for example, mixing NiO powder, the metal oxide in powder, and the like and sintering.

As the metal oxide, a known material used as a solid electrolyte of a fuel cell may be used. Specifically, from the viewpoint of proton conductivity, a preferable example of the metal oxide is a compound having a perovskite crystal structure represented by $ABO_3$ (hereinafter called perovskite oxide). $ABO_3$ includes $ABO_{3-\delta}$ ($\delta$ denotes an oxygen vacancy concentration) crystal structure. The perovskite crystal structure refers to a crystal structure similar to $CaTiO_3$. The ionic radius of the element included in the A site is greater than that included in the B site. From the viewpoint of oxide ion conductivity, a preferable example of the metal oxide is a compound including zirconium dioxide (hereinafter called zirconium compound).

The metallic element included in the A site is not particularly limited, and may be, for example, a Group 2 element such as barium (Ba), calcium (Ca), and/or strontium (Sr). Only one type of these may be used, or two or more types of these may be used in combination. Among those, from the viewpoint of proton conductivity, Ba is preferably included in the A site.

Examples of the metallic element included in the B site include cerium (Ce), zirconium (Zr), and yttrium (Y). Among these, from the viewpoint of proton conductivity, at least one of Zr and Ce is preferably included in the B site. The B site is partially substituted by a trivalent rare earth element other than cerium; this dopant causes oxygen vacancy and thereby the perovskite oxide exhibits proton conductivity.

Examples of the trivalent rare earth element (dopant) other than cerium include yttrium (Y), scandium (Sc), neodymium (Nd), samarium (Sm), gadolinium (Gd), holmium (Ho), erbium (Er), thulium (Tm), ytterbium (Yb), and lutetium (Lu). Among these, from the viewpoints of proton conductivity and chemical stability, Y or an element with a smaller ionic radius than Y preferably occupies part of the B site. Examples of this element include Sc, Ho, Er, Tm, Yb, and Lu. The B site may include an element other than a rare earth element that acts as a dopant (for example, indium (In)).

Among the perovskite oxides, particularly from the viewpoints of excellent proton conductivity and excellent power-generating performance, compounds represented by formula (1-1): $Ba_{x1}Ce_{1-y1}Y_{y1}O_{3-\delta}$ (0.95≤x1≤1, 0<y1≤0.5, BCY), formula (2-1): $Ba_{x2}Zr_{1-y2}Y_{y2}O_{3-\delta}$ (0.95≤x2≤1, 0<y2≤0.5, BZY), and formula (3-1): $Ba_{x3}Zr_{1-y3-y4}Ce_{y3}Y_{y4}O_{3-\delta}$ (0.95≤x3≤1, 0<y4≤0.5, BZCY) (which is a solid solution of the above two) are preferable. Only one type of these perovskite oxides may be used, or two or more types of these may be used in combination. In this case, Y occupying the B site may be partially substituted by other elements (for example, other lanthanoid elements), and Ba occupying the A site may be partially substituted by other Group 2 elements (such as Sr, Ca).

The zirconium compound, which is also a preferable compound as the metal oxide, contains zirconium dioxide and at least one element selected from the group consisting of Ca, Sc, and Y which forms a substitutional solid solution with Zr. With this configuration, the zirconium compound exhibits oxide ion conductivity. Preferable examples of the zirconium compound include yttria-stabilized zirconia ($ZrO_2$—$Y_2O_3$, YSZ) from the viewpoints of oxide ion conductivity and cost.

Cathode

Cathode 12 has a porous structure that is capable of adsorbing, dissociating, and ionizing oxygen molecules. The material of cathode 12 may be, for example, a known material used as a fuel cell cathode. For example, the material of cathode 12 is a compound of a perovskite structure. Specific examples include lanthanum strontium cobalt ferrite (LSCF, $La_{1-a}Sr_aCo_{1-b}FebO_{3-\delta}$, 0<a<1, 0<b<1, δ denotes an oxygen vacancy concentration), lanthanum strontium manganite (LSM, $La_{1-c}Sr_cMnO_{3-\delta}$, 0<c<1, δ denotes an oxygen vacancy concentration), lanthanum strontium cobaltite (LSC, $La_{1-d}Sr_dCoO_{3-\delta}$, 0<d<1, δ denotes an oxygen vacancy concentration), and samarium strontium cobaltite (SSC, $Sm_{1-e}Sr_eCoO_{3-\delta}$, 0<e<1, δ denotes an oxygen vacancy concentration).

Cathode 12 may include a catalyst such as nickel, iron, and/or cobalt. The cathode including a catalyst may be formed by mixing the catalyst and the above-described material and sintering. The thickness of cathode 12 is not particularly limited, and may be from about 5 µm to about 100 µm.

Electrolyte Layer

Electrolyte layer 13 includes an ionically-conductive solid oxide. The ions moving within electrolyte layer 13 are not particularly limited, and may be oxide ions or may be hydrogen ions (protons). Particularly preferably, electrolyte layer 13 has proton conductivity. A proton-conducting fuel cell (PCFC) is operable at a moderate temperature from 400° C. to 600° C., for example. Therefore, a PCFC has various applications. The thickness of electrolyte layer 13 is not particularly limited, and is preferably from about 5 µm to about 100 µm for achieving a low resistance.

Examples of the ionically-conductive solid oxide include the metal oxide used in anode 11. Electrolyte layer 13 may contain a component other than the metal oxide, but its content is preferably low. For example, the metal oxide preferably accounts for 99 mass % or more of electrolyte layer 13. The component other than the metal oxide is not particularly limited, and examples thereof may include a compound known as a solid electrolyte (including a non-ionically-conductive compound).

Current Collector

The anode-side current collector 110A has the current-collecting function as well as the function to diffuse fuel gas introduced through fuel channel 130A and supply it to anode 11. The cathode-side current collector 110B has the current-collecting function as well as the function to diffuse oxidizer gas introduced through oxidizer channel 130B and supply it to cathode 12. Therefore, each current collector is preferably a low-resistance, breathable structure. The metal porous body according to the present embodiment is suitable as the current collectors.

Examples of a structure used for the current collectors, other than the metal porous body, include metal mesh, perforated metal, and expanded metal containing platinum, silver, silver alloy, Ni, Ni alloy, and/or the like.

Separator

Fuel channel 130A may be, for example, disposed in a separator 120A, which is disposed on the exterior side of anode 11. Similarly, oxidizer channel 130B may be, for example, disposed in a separator 120B, which is disposed on the exterior side of cathode 12.

For instance, in the configuration in which a plurality of cells 100 are stacked to form fuel cell 200, cell 100 and one current collector and one separator are regarded as a single stack unit. For instance, the plurality of cells 100 may be connected in series via a separator flanked by gas channels (the oxidizer channel and the fuel channel).

Examples of the material of separators 120A, 120B may include heat-resistant alloys such as stainless steel, nickel-based alloy, and chromium-based alloy from the viewpoints of electrical conductivity and heat resistance. Among these, stainless steel is preferable for its low cost. When the operation temperature of fuel cell 200 is from about 400° C. to about 600° C., stainless steel may be used as a material of the separator.

Notes

The above description includes the below-noted embodiments.

(Note 1)

A metal porous body comprising a first surface and a second surface opposite to the first surface and formed of fiber-shaped metal, the first surface and the second surface comprising openings defined by entanglement of the fiber-shaped metal, in an internal region between the first surface and the second surface, voids being defined by three-dimensional entanglement of the fiber-shaped metal, the openings and the voids communicating with each other, a porosity being from 1 volume % to 55 volume %, a density being from 3 g/cm$^3$ to 10 g/cm$^3$.

(Note 2)

The metal porous body according to Note 1, wherein a diameter of the openings is from 3 µm to 55 µm.

(Note 3)

The metal porous body according to Note 1 or Note 2, wherein a thickness is from 0.05 mm to 0.2 mm.

(Note 4)

A method of producing a metal porous body, comprising:

a first step involving preparing a metal material having a frame of a three-dimensional network structure; and a second step involving pressing the metal material.

(Note 5)

The method of producing a metal porous body according to Note 4, wherein, in the second step, a plurality of the metal materials are stacked so that the metal materials overlap at least partially, and parts thus overlapping are pressed.

(Note 6)

A fuel cell comprising:

a cathode;

an anode;

an electrolyte layer interposed between the cathode and the anode; and the metal porous body according to Note 1 disposed to face at least one of the cathode and the anode.

EXAMPLES

Next, a specific description will be given of the present disclosure based on Examples. However, the below Examples do not limit the scope of the present disclosure.

Example 1

A fuel cell was prepared by the below procedure.

(1) Preparation of Metal Material

As a metal material, Celmet made of nickel manufactured by Sumitomo Electric Industries, Ltd. (registered trademark; product number #8; opening diameter, 450 µm; thickness, 1.4 mm) was prepared.

(2) Preparation of Metal Porous Body

Figure 4:
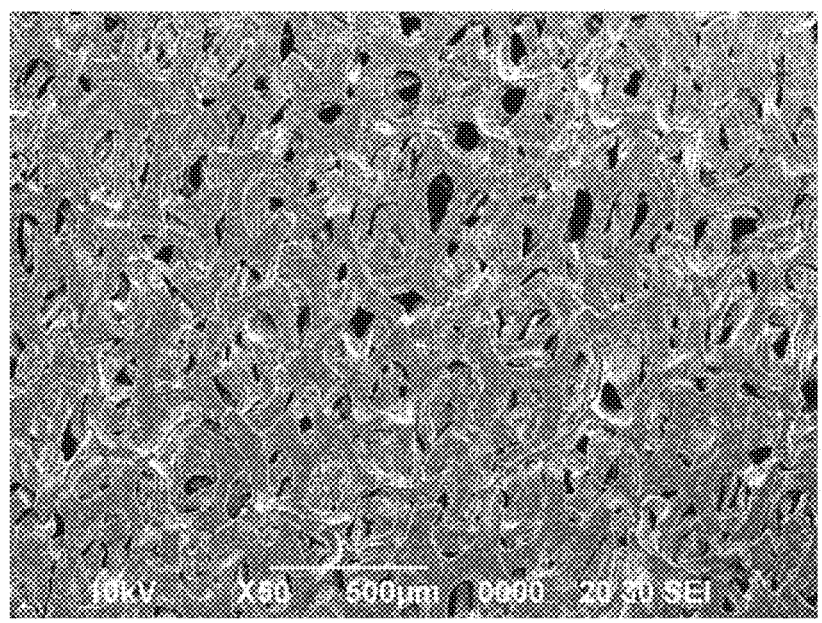
FIG. 4 is a scanning electron micrograph of a metal porous body of Example 1 taken from one surface thereof.

The metal material was roll-pressed into an overall thickness of the metal material of about 5%, and thus a metal porous body A (thickness, 0.075 mm) was prepared. FIG. 4 is a scanning electron microscope (SEM) photograph taken from one surface of metal porous body A. The surface of metal porous body A had an opening diameter Ds of 50 µm and a diameter of metal fibers (namely, a diameter of bone members) Ws of 63 µm.

(3) Preparation of Cell

A cell was prepared by the below procedure.

First, NiO was mixed with BZY ($BaZr_{0.8}Y_{0.2}O_{2.9}$) to achieve a Ni (catalyst component) content of 70 volume %, followed by pulverization and kneading in a ball mill. Then, press forming was performed to obtain an anode formed body (thickness, 550 μm), followed by preliminary sintering at 1000° C. Subsequently, to one side of the resulting formed body, a mixed paste of BZY ($BaZr_{0.8}Y_{0.2}O_{2.9}$) and a water-soluble binder resin (ethylcellulose) was applied by screen printing, and then the water-soluble binder resin was removed at 750° C. It is followed by co-sintering by means of heat treatment at 1400° C. in an oxygen atmosphere, and thus an anode and an electrolyte layer (thickness, 10 μm) were formed.

Subsequently, a surface of the resulting electrolyte layer was coated with an LSCF paste of a cathode material LSCF ($La_{0.6}Sr_{0.4}Co_{0.2}Fe_{0.8}O_{3-\delta}$) powder and the above-described organic solvent by screen printing, followed by sintering in an oxygen atmosphere at 1000° C. for 2 hours to prepare a cell. The thickness of the cathode was 10 μm.

(4) Preparation of Fuel Cell

On a surface of the anode of the resulting cell, metal porous body A was stacked, and further, a stainless steel, anode-side interconnector with a smooth surface was stacked. On a surface of the cathode, a stainless steel, cathode-side interconnector having a gas channel was stacked. Thus, a fuel cell A was prepared. To each of the anode-side interconnector and the cathode-side interconnector, an end of a lead wire was bonded. The other end of each lead wire was pulled out of the fuel cell and connected to a measuring instrument for measuring the current and the voltage between the lead wires.

(5) Evaluation of Power-Generating Performance

At an operation temperature of 600° C., hydrogen was introduced as fuel gas into the anode of the above-prepared fuel cell A at 0.3 L/minute and air was introduced into the cathode at 1.0 L/minute, and the maximum power density was obtained. Results are shown in Table 1.

Example 2

Figure 5:
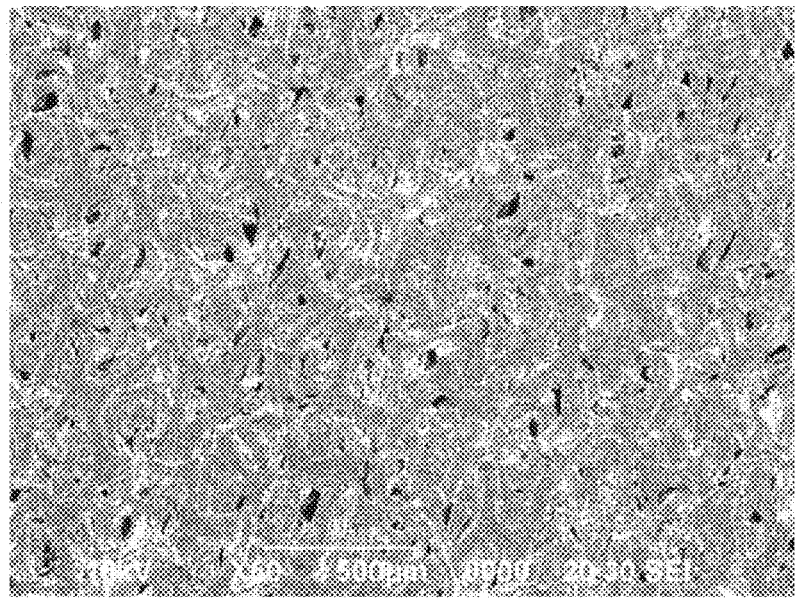
FIG. 5 is a scanning electron micrograph of a metal porous body of Example 2 taken from one surface thereof.

A metal porous body B (thickness, 0.117 mm) and a fuel cell B were prepared and evaluated in the same manner as in Example 1 except that two metal materials were prepared in the above-described manner and they were stacked and pressed. Results are shown in Table 1. FIG. 5 is an SEM photograph of metal porous body B taken from one surface thereof. The surface of metal porous body B had an opening diameter Ds of 12 μm and a diameter of metal fibers Ws of 66 μm.

Example 3

Figure 6:
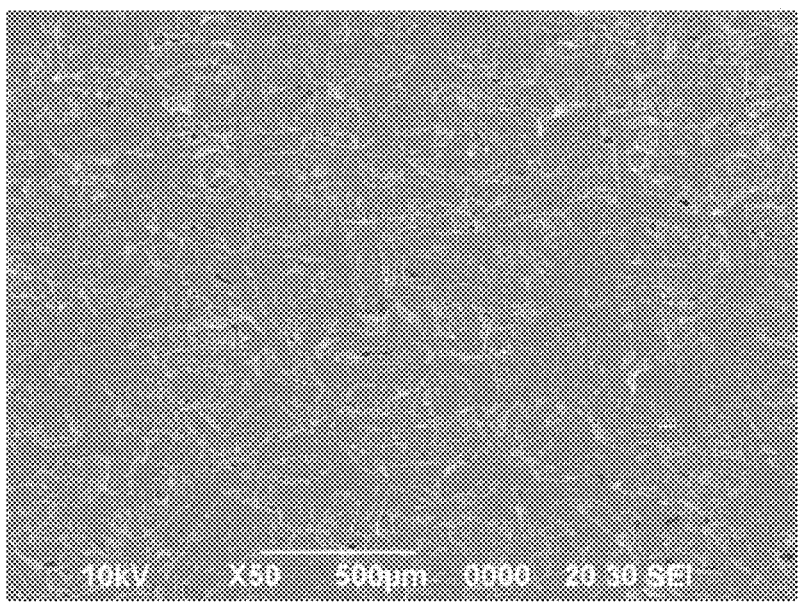
FIG. 6 is a scanning electron micrograph of a metal porous body of Example 3 taken from one surface thereof.

A metal porous body C (thickness, 0.117 mm) and a fuel cell C were prepared and evaluated in the same manner as in Example 1 except that three metal materials were prepared in the above-described manner and they were stacked and pressed. Results are shown in Table 1. FIG. 6 is an SEM photograph of metal porous body C taken from one surface thereof. The surface of metal porous body C had an opening diameter Ds of 5 μm and a diameter of metal fibers Ws of 83 μm.

Example 4

Figure 7:
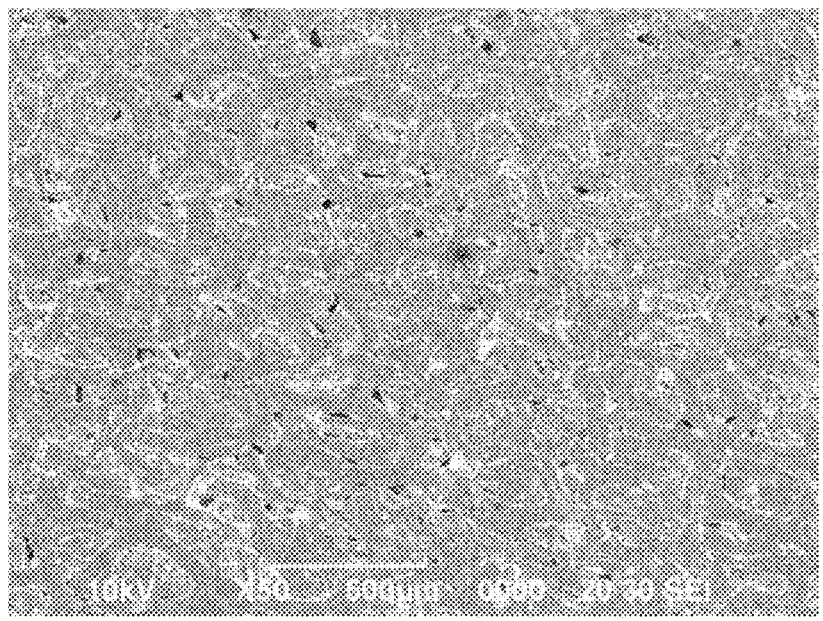
FIG. 7 is a scanning electron micrograph of a metal porous body of Example 4 taken from one surface thereof.

A metal porous body D (thickness, 0.160 mm) and a fuel cell D were prepared and evaluated in the same manner as in Example 1 except that four metal materials were prepared in the above-described manner and they were stacked and pressed. Results are shown in Table 1. FIG. 7 is an SEM photograph of metal porous body D taken from one surface thereof. The surface of metal porous body D had an opening diameter Ds of 10 μm and a diameter of metal fibers of Ws of 86 μm.

Example 5

Figure 8:
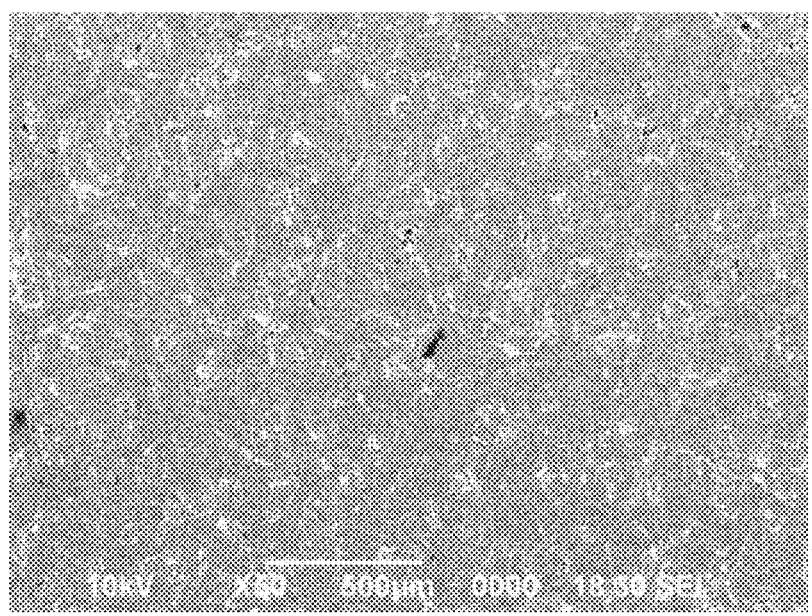
FIG. 8 is a scanning electron micrograph of a metal porous body of Example 5 taken from one surface thereof.

A metal porous body E (thickness, 0.187 mm) and a fuel cell E were prepared and evaluated in the same manner as in Example 1 except that five metal materials were prepared in the above-described manner and they were stacked and pressed. Results are shown in Table 1. FIG. 8 is an SEM photograph of metal porous body E taken from one surface thereof. The surface of metal porous body E had an opening diameter Ds of 4 μm and a diameter of metal fibers of Ws of 95 μm.

Comparative Example 1

A fuel cell a was prepared and evaluated in the same manner as in Example 1 except that metal porous body A was replaced by the above-described metal material before pressing. Results are shown in Table 1.

TABLE 1

| Fuel cell | Current collector | Porosity (volume %) | Density (g/cm$^2$) | Maximum power density (mW/cm$^2$) |
|---|---|---|---|---|
| A | Metal porous body A | 51 | 4.40 | 260 |
| B | Metal porous body B | 37 | 5.64 | 305 |
| C | Metal porous body C | 5 | 8.46 | 348 |
| D | Metal porous body D | 7 | 8.25 | 324 |
| E | Metal porous body E | 1 | 8.82 | 291 |
| a | Metal material | 97 | 0.24 | 178 |
| b | Metal porous body b | 60 | 3 | 152 |
| c | Metal porous body c | 1 | 11 | 122 |

Fuel cells A to E including a metal porous body obtained by pressing a metal material had an excellent power-generating performance compared to fuel cell a. This metal porous body has a sufficient porosity and a high density and can deform plastically. Therefore, the use of the metal porous body as a current collector probably has reduced resistance and improved fluid permeability.

REFERENCE SIGNS LIST

101: pores (voids), 102: fiber member (bone member), 102a: cavity, 103: window (opening), 11: anode, 12: cathode, 13: electrolyte layer, 100: cell, 110A, 110B: current collector, 120A, 120B: separator, 130A: fuel channel, 130B: oxidizer channel, 200: fuel cell.

The invention claimed is:

1. A fuel cell comprising:
a cathode;
an anode;
an electrolyte layer interposed between the cathode and the anode; and
a metal porous body having a frame of a three-dimensional network structure, wherein
the metal porous body is disposed to face at least one of the cathode and the anode,
the frame is formed of a plurality of bone members connected to each other,
the plurality of bone members define openings in a surface of the metal porous body,
the plurality of bone members define voids inside the metal porous body,
the openings and the voids communicate with each other,
a porosity is from 1 volume % or more to 10 volume % or less,
a density is from 3 g/cm$^3$ to 10 g/cm$^3$,
a diameter of the openings is 3 um or more and less than 5 um, and
the fuel cell generates electricity at a maximum power density of 291-348 mW/cm$^2$.

2. The fuel cell according to claim 1, wherein
the metal porous body has a sheet-like outer shape and a thickness from 0.05 mm to 0.2 mm.

* * * * *